Figure 1:
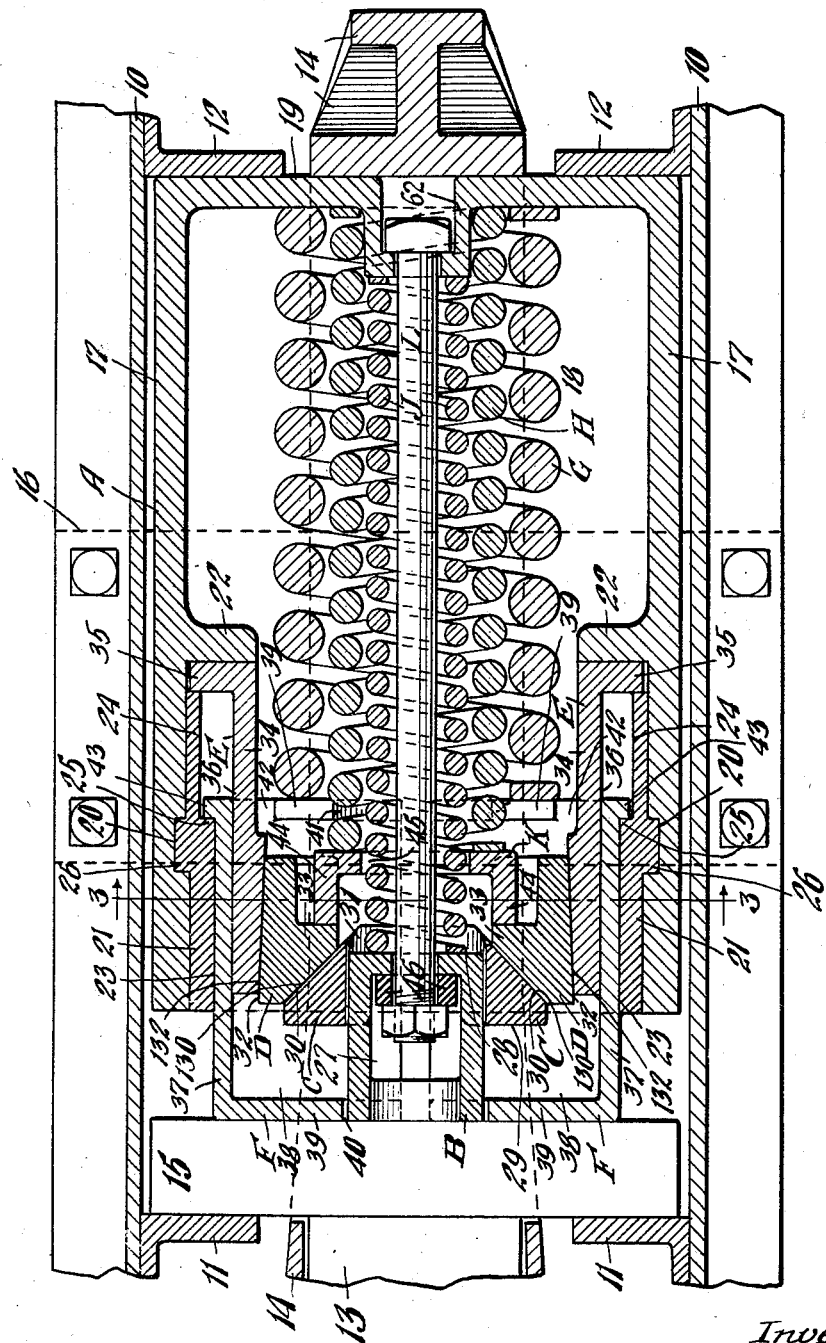

May 20, 1930.   J. F. O'CONNOR   1,758,966
FRICTION SHOCK ABSORBING MECHANISM
Filed Nov. 4, 1927   2 Sheets-Sheet 1

Witness
Wm. Geiger

Inventor
John F. O'Connor
By George I. Haight
His Atty.

May 20, 1930.  J. F. O'CONNOR  1,758,966
FRICTION SHOCK ABSORBING MECHANISM
Filed Nov. 4, 1927   2 Sheets-Sheet 2
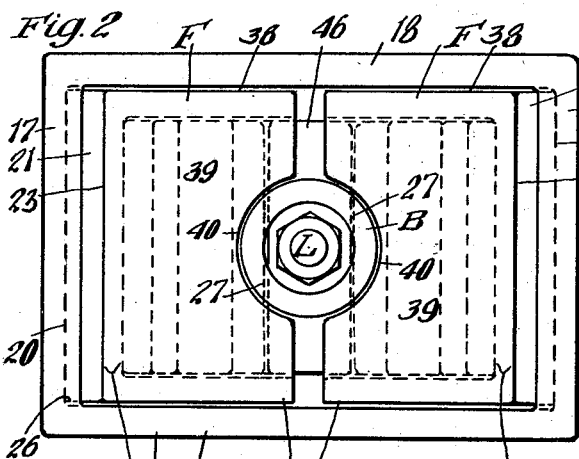
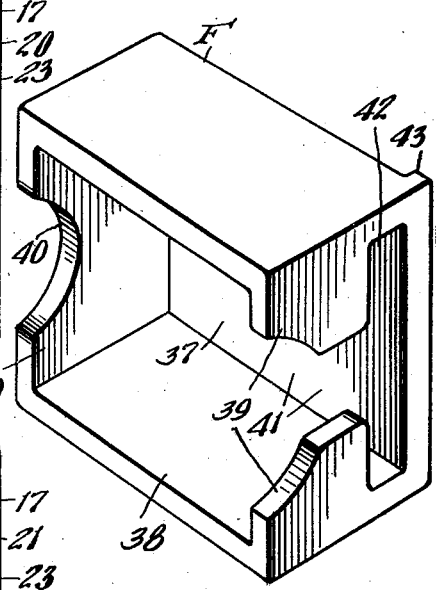
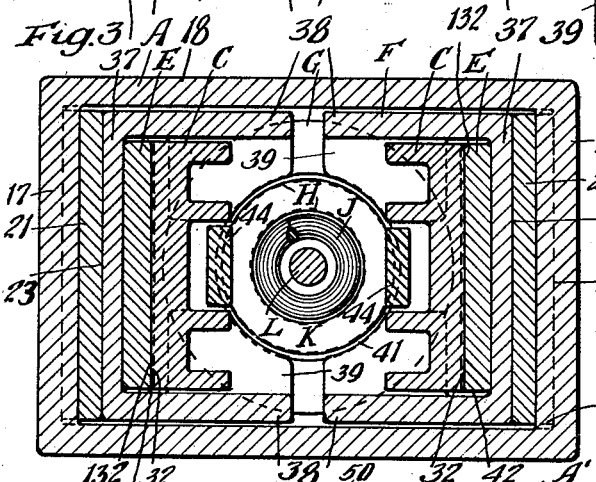
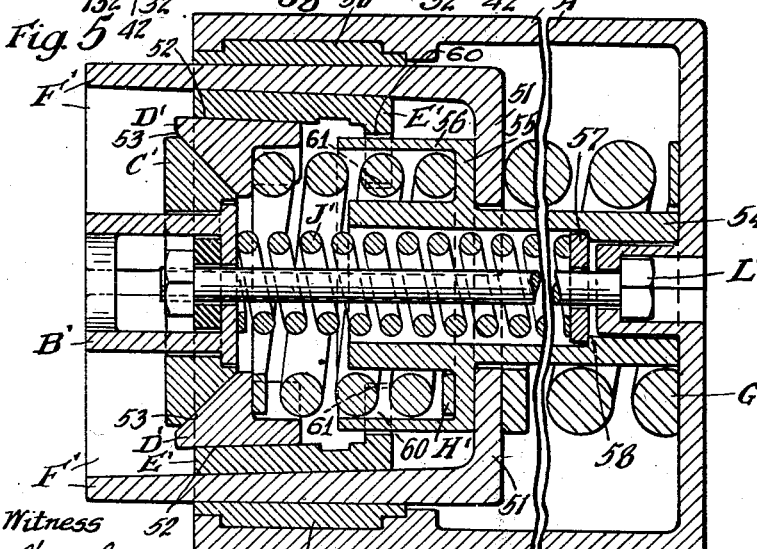
Inventor
John F. O'Connor Patented May 20, 1930

1,758,966

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK-ABSORBING MECHANISM

Application filed November 4, 1927. Serial No. 230,943.

This invention relates to improvements in friction shock absorbing mechanisms.

One object of the invention is to provide an efficient friction shock absorbing mechanism, especially adapted for railway draft riggings, having relatively light spring resistance during the first part of the compression stroke, followed by heavier frictional resistance, wherein the frictional resistance is produced by a plurality of relatively movable friction elements wherein the friction elements are of exceptionally great strength, thereby adding materially to the life of the mechanism.

A more specific object of the invention is to provide a mechanism of the character indicated, including a casing having a friction shell section at one end thereof, a plurality of spring resisted friction elements co-operating with the shell section and actuated during the entire compression stroke of the mechanism, friction elements fixed against longitudinal movement with respect to the shell, spring resisted friction shoes co-operating with the relatively fixed friction elements, a wedging member co-operating with the shoes and adapted to be actuated after a predetermined compression of the mechanism, and a spring resisted pressure transmitting block adapted to receive the actuating force during the first part of the compression stroke.

Other and further objects of the invention will more clearly appear from the description and claims hereinafter following.

In the drawings, forming a part of this specification, Figure 1 is a horizontal, longitudinal, sectional view of a portion of a railway draft rigging showing my improvements in connection therewith, Figure 2 is a front end elevational view of my improved shock absorbing mechanism proper, Figure 3 is a vertical, transverse, sectional view, corresponding substantially to the line 3—3 of Figure 1, Figure 4 is a detailed perspective view of one of the movable friction elements employed in connection with my improved mechanism, and Figure 5 is a horizontal, longitudinal, sectional view of a different embodiment of my improved shock absorbing mechanism.

In said drawings, 10—10 indicate channel-shaped center or draft sills of a railway car underframe, to the inner sides of which are fixed front stop lugs 11—11 and rear stop lugs 12—12. The inner end portion of the draw bar is indicated by 13, to which is connected a yoke 14 of well known form. A front main follower 15 and my improved shock absorbing mechanism are disposed within the yoke. The yoke and the parts therewithin are supported in operative position by a detachable saddle plate 16 secured to the draft sills.

My improved shock absorbing mechanism proper as disclosed in the embodiment of the invention illustrated in Figures 1 to 4, inclusive, comprises broadly a casing A; a pressure transmitting block B; a wedge block C; two friction shoes D—D; two fixed friction elements E—E; two movable friction elements F—F; a spring resistance means comprising three elements G, H and J; a spring follower K, and a retainer bolt L.

The casing A, as illustrated in Figures 1 to 4, inclusive, is in the form of a substantially rectangular boxlike casting, having longitudinally disposed spaced vertical side walls 17—17, horizontally disposed, longitudinally extending, spaced top and bottom walls 18—18, and a transverse vertical rear end wall 19. The end wall 19 co-operates with the stop lugs 12 in the manner of the usual rear follower. The side walls 17 of the casing A are provided with vertical slots on the inner sides thereof, adjacent the front end, the slots serving as seats 20 to anchor the liners 21 to the casing. Rearwardly of the seats 20, each side wall 17 is provided with a relatively wide, vertically disposed, laterally projecting rib 22, forming abutment means for the inner ends of the fixed friction elements.

The side walls 17 of the casing A are provided with the liners 21, the latter, together with the top and bottom walls of the casing, forming a friction shell section of the mechanism. Each of the liners 21 is in the form of a substantially rectangular plate having a longitudinally disposed flat friction surface 23 on the inner side thereof. At the rear end, the liner 21 is cut away, as indicated at 24, thereby forming a transverse shoulder 25 intermediate the front and rear ends of the liner, serving as a limiting stop in connection with the movable friction element F at the same side of the mechanism. On the outer side, each liner is provided with a vertically disposed, relatively wide, rib 26, adapted to seat within the corresponding seat 20 of the side wall of the casing A. It will be evident that the ribs 26, when accommodated within the seats 20, serve as anchoring means for the liners to hold the same against movement longitudinally of the casing A. As most clearly shown in Figure 1, the liners 21 have their inner ends spaced from the ribs 22.

The pressure transmitting block B is in the form of a hollow cylindrical member, open at its forward end and having openings 27—27 in the sides thereof. The inner end of the block B presents a flat face 28, serving as an abutment for the forward end of the central coil J of the spring resistance. As most clearly shown in Figure 1, the front end of the block B bears on the inner side of the main follower 15.

The wedge C is in the form of a heavy block having a flat transverse front face 29, adapted to receive the actuating force. At the inner end, the block C is provided with wedge faces 30—30 on the opposite sides thereof. The block C is centrally recessed, as indicated at 31, to accommodate the block B for sliding movement.

The friction shoes D, which are disposed at opposite sides of the wedge block C, are of similar design. Each friction shoe is provided with a longitudinally disposed flat outer friction surface 32. On the inner side, each shoe is laterally enlarged, as indicated at 33, the enlargements being provided with wedge faces 130 at the forward side thereof, adapted to co-operate with the wedge faces 30 of the wedge block C.

The fixed friction elements E are two in number and are disposed at opposite sides of the mechanism. Each friction element E comprises a main platelike section 34 and a laterally projecting flange section 35 at the rear end thereof. The flangelike section 35 bears directly on the corresponding rib 22 of the casing A, and inward movement of the element E with respect to the casing is thus prevented. Each flange 35 is of such a thickness as to be accommodated between the inner end of the corresponding liner and the rib 22. It will be evident that the two friction elements E are thus held against movement with respect to the casing in a longitudinal direction, the liners preventing outward movement of the same. As clearly shown in Figure 1, a slight clearance is left between the outer ends of the flanges 35 and the side walls of the casing, thus permitting slight lateral displacement of the elements E, which is necessary during the compression of the mechanism. On the inner side, at the forward end thereof, each friction element E is provided with a longitudinally disposed flat friction surface 132, adapted to co-operate with the friction surface 32 of the friction shoe D at the same side of the mechanism. The opposed friction surfaces 132 are preferably converged inwardly of the mechanism, as shown in Figure 1. On the outer side, each friction element E is provided with a longitudinally disposed flat friction surface 36.

The friction elements F are of similar design and are disposed at opposite sides of the mechanism. Each of the friction elements F comprises a vertically disposed flat platelike section 37, having inwardly projecting top and bottom wall sections 38—38 and vertically disposed end wall sections 39—39, connecting the top and bottom wall sections. The front end wall section 39 is recessed as indicated at 40 to accommodate the corresponding side of the pressure transmitting block B. The inner end wall 39 is recessed as indicated at 41 and 42 to accommodate the spring H and the fixed friction elements E, respectively. The platelike sections 37 of the friction elements F are interposed directly between the fixed friction elements E and the liners 21, and have friction surfaces on the opposite sides thereof co-operating with the friction surfaces of the friction elements E and the liners respectively. At the inner end, the plate like section 37 of each friction element F is provided with a lateral outwardly extended rib 43, adapted to engage in back of the shoulder 25 of the liner at the same side of the casing A and thus limit the outward movement of the friction element F. The front walls 39 of the friction elements F bear directly on the inner side of the main follower 15.

The spring resistance means which comprises the three elements, G, H and J, is disposed within the casing A and opposes inward movement of the parts of the mechanism. The outer coil G of the spring resistance is relatively heavy and is interposed between the end wall 19 of the casing A and the movable friction elements F, bearing on the end walls 39 of said elements. The coil H is disposed within the coil G and has the rear end thereof bearing on the wall 19 and the front end bearing on the spring follower K. The spring H is preferably lighter than the spring G. Disposed within the spring H is the spring J, which has the rear end thereof bearing on an inwardly extending hollow boss 62 on the end wall 19 and the front end thereof bearing directly on the inner end of the pressure transmitting block B.

The spring J is preferably of lighter design than both the springs G and H.

The spring follower K, which is interposed between the spring H and the friction shoes D, comprises a platelike section having forwardly projecting arms 44 bearing directly on the enlarged portions of the friction shoes D. The platelike section of the spring follower K is provided with an opening 45, which freely accommodates the front end of the central coil J of the spring resistance.

The parts of the mechanism are held assembled and of over-all uniform length by the retainer bolt L, which has the head thereof disposed within the hollow boss 45 of the casing A. The nut of the bolt is disposed within the opening of the pressure transmitting block B and bears on a transverse bar 46, for limiting the outward movement of the wedge block C and extending through the side openings of the pressure transmitting block B. As will be evident, the nut of the bolt L positively prevents outward movement of the wedge block C and the bar 46 in this block, which bears on the inner end wall of the pressure transmitting block B, prevents outward movement of the latter.

In addition to holding the parts assembled, the retainer bolt L is also utilized to place the springs H and J under an initial compression. Compensation for wear of the various friction and wedge faces of the mechanism is had by the expansive action of the spring H, which, as hereinbefore pointed out, is under initial compression. The tendency of the spring H to expand forces the friction shoes D—D outwardly, and due to the coacting wedge faces between the shoes and the wedge C the shoes are spread laterally apart, holding the friction surfaces of the shoes, the fixed friction elements, the movable friction elements and the liners in intimate contact..

In assembling the improved shock absorbing mechanism as illustrated in Figures 1 to 4, inclusive, the main spring resistance element G, H and J, and the friction system, comprising the wedge block, friction shoes, movable friction elements, fixed friction elements, and the liners, are assembled and inserted within the casing. While thus loosely assembled, the liners are so adjusted as to seat the ribs thereof within the seats of the side walls of the casing, and the flanges 35 of the fixed friction elements E are disposed between the inner ends of the liners and the ribs 22. After the parts have been thus far assembled, the mechanism is compressed and the retainer bolt anchored to the wedge block and casing A.

The operation of my improved shock absorbing mechanism, as illustrated in Figures 1 to 4, inclusive, is as follows, during a compression stroke: The front follower 15 and the casing A will be moved relatively toward each other, forcing the movable friction elements and the pressure transmitting block B inwardly of the casing A. During the inward movement of the block B and the elements F, the springs J and G will be compressed. During this action, there will be substantially no movement of the other parts of the mechanism. In this connection, it is pointed out that the action produced during the first part of the compression stroke is substantially a free spring action, there being very little frictional resistance produced between the movable friction elements, the fixed friction elements, and the liners at this time. The inward movement of the elements F and the pressure transmitting block B will continue as described until the front walls 39 of the elements F engage the wedge block C, whereupon the wedge block C will be forced inwardly in unison with the elements F and a wedging action will be set up between the wedge block and the friction shoes D, forcing the latter apart while carrying the same inwardly of the casing A. The inward movement of the friction shoes D is resisted by the spring H. Due to the converging relation of the inner friction surfaces 132 of the fixed friction elements E, the friction shoes will be forced to approach each other laterally, thereby creating a differential action, the wedge faces of the shoes slipping on the wedge faces of the block C. This differential action will effect an additional compression of the spring H. The described action will continue either until the actuating force is reduced or the main follower 15 comes into engagement with the front end of the casing A, whereupon the actuating force will be transmitted directly through the casing A, the latter acting as a solid column load transmitting member to prevent the springs of the mechanism from being unduly compressed.

During release of the mechanism, the expanding action of the springs G, H and J, will force the parts outwardly, the movable friction elements F being carried outwardly by the expansion of the outer spring G. The outward movement of the friction elements F will finally be limited by the engagement of the flanges thereof with the abutment shoulders on the liners 21. The pressure transmitting block B and the friction shoes D will be forced outwardly by the action of the springs J and H, respectively, and outward movement of these parts will be limited by the bar in the wedge C engaging the nut of the bolt L, and the inner end wall of the pressure transmitting block B engaging the bar in the wedge block. When these parts are arrested by the action of the retainer bolt L, the front end of the wedge C is spaced an appreciable distance from the front walls 39 of the pressure transmitting elements F.

Referring next to the embodiment of the invention, as illustrated in Figure 5, the same comprises a casing A' of substantially the same design as the casing A hereinbefore described. The casing A' is provided with detachable liners 50, anchored to the side walls of the casing at the forward end thereof, thus defining with the top and bottom walls of the casing a friction shell section. A pair of movable friction elements F' co-operate with the inner friction surfaces of the liners 50, each element F' being in the form of a channel-shaped member having a transverse rear end wall 51 on which a relatively heavy spring resistance element G' bears. The opposite end of the spring G' bears on the transverse rear end wall of the casing A'. The inner surfaces of the vertical side members of the movable friction elements F' are inwardly converged, as clearly shown in Figure 5. A pair of fixed friction elements, having friction surfaces on the outer sides thereof, co-operate with the friction elements F'. The relatively fixed friction elements, which are indicated by E', are held to the casing by ribs 60 at the inner ends thereof engaging within transverse grooves 61 on the top and bottom walls of the casing so as to prevent longitudinal movement thereof with respect to the casing and still permit slight lateral displacement. On the inner side, each friction element E' is provided with a friction surface 52, adapted to co-operate with a similar friction surface on the shoe D' at the same side of the mechanism. Each shoe D' is provided with an outer wedge face 53 which co-operates with the main wedge C'. The wedge C' and the shoes D' are of substantially the same design as the corresponding parts described in connection with Figures 1 to 4 inclusive. The wedge block C' has a transverse bar which extends through openings in the pressure transmitting block B'. The pressure transmitting block B' is similar to the block B hereinbefore described, with the exception that it is provided with an annular projecting flange at the inner end thereof, which engages within a seat at the inner end of the wedge block C'. The parts of the mechanism are held assembled and of over-all uniform length by a retainer bolt L', which has the head thereof disposed within a hollow boss on the rear end wall of the casing A' and has the nut thereof bearing on the transverse bar in the wedge block C'. A tubular post 54 is disposed within the coil spring G', the post having the rear end thereof bearing directly on the end wall of the casing A'. At the forward end, the post 54 is provided with an annular flange 55 having a forwardly extended cylindrical portion 56 adapted to receive the inner end of a coil spring H', interposed between the flange 55 and the friction shoes D'. The end wall 51 of each friction element F' is adapted to engage the flange 55 of the post 54, thereby limiting outward movement of the elements F'. A central coil spring J' is interposed between the inner end of the pressure transmitting block B' and a washer or disc 57 disposed within the post 54 and bearing on transverse shoulders 58 adjacent the rear end of the post. Inasmuch as the parts are held assembled by the bolt L', the expansive action of the spring J' will hold the post yieldingly seated on the end wall of the casing A'.

When the parts are assembled, the springs are preferably placed under initial compression.

The operation of the embodiment of the invention illustrated in Figure 5 is similar to that hereinbefore described. The pressure transmitting block B' and the movable friction elements F' will be forced inwardly of the casing during the first part of the compression stroke of the mechanism, thus compressing the springs G' and J'. This action will continue until the main follower engages the wedge block C', whereupon a wedging action will be set up between the wedge and the friction shoes, and the friction surfaces of the plates forced into intimate contact. During the last part of the compression stroke, the friction shoes will slide inwardly on the converged friction surfaces of the elements E', and the friction elements F' will slide on the friction surfaces of the elements E' and the liners 50.

In release of the mechanism, the springs G', H', and J', will restore all of the parts to normal position, outward movement of the pressure transmitting block B' and the wedge C' being limited by the retainer bolt L', and outward movement of the friction elements F' being limited by the flange 55 on the post 54.

From the preceding description taken in connection with the drawings, it will be evident that I have provided a friction shock absorbing mechanism which has substantially free spring action during a considerable part of the compression stroke, followed by heavier frictional resistance. This arrangement adapts the gear especially for passenger equipment, the free spring capacity being sufficient to absorb all of the normal shocks to which the mechanism is subjected and the frictional resistance of the gear being available to absorb the abnormally heavy shocks.

While I have herein shown and described what I consider the preferred manner of carrying out the invention, the same is merely illustrative, and I contemplate all changes and modifications which come within the scope of the claims appended hereto.

I claim:

1. In a friction shock absorbing mechanism, the combination with a follower acting member and a follower relatively movable toward and away from each other; of a pressure transmitting element co-operating with the follower; a plurality of relatively stationary friction elements anchored to said member against longitudinal movement with respect thereto; a plurality of movable friction elements actuated by the follower and having frictional engagement with said member; friction shoes having frictional engagement with the stationary friction elements; wedge means co-operating with the shoes, said wedge means being actuated after a predetermined compression of the mechanism; and spring resistance means including a plurality of separate, independently acting elements respectively opposing inward movement of the pressure-transmitting element, movable friction elements and friction shoes.

2. In a friction shock absorbing mechanism, the combination with a casing having a friction shell section at one end thereof; friction elements adapted to receive the actuating force during the entire compression stroke of the mechanism, said elements being movable with respect to the friction shell section and having frictional engagement therewith; friction elements fixed against longitudinal movement with respect to the casing, said fixed elements having frictional engagement with the movable elements; friction shoes engaging the fixed elements; a block having wedging engagement with the shoes, said block being actuated after a predetermined compression of the mechanism; a pressure transmitting element actuated during the entire compression stroke of the mechanism; spring resistance means opposing movement of the pressure transmitting element; and additional spring resistance means acting independently of said first named spring resistance means for opposing movement of said shoes and movable elements only.

3. In a friction shock absorbing mechanism, the combination with a main follower; of a casing, said casing and follower being relatively movable toward and away from each other; a plurality of friction elements movable with respect to the casing, said elements being engaged and actuated by the follower; friction shoes; wedge means normally spaced from the main follower and co-operating with the shoes; relatively fixed friction elements interposed between the shoes and the movable friction elements; a pressure transmitting element engaged by the main follower; spring means opposing inward movement of the friction shoes and movable frction elements; and additional, independently acting spring resistance means opposing inward movement of the pressure transmitting element only.

4. In a friction shock absorbing mechanism, the combination with a casing having a friction shell section at one end thereof; of a main follower movable toward and away from said casing; movable friction elements co-operating with the friction shell section of the casing, said movable elements being provided with flanges bearing on the main follower; friction shoes; a wedge block co-operating with the shoes and normally spaced from the flanges of the movable friction elements and adapted to be engaged and actuated thereby, after a predetermined compression of the mechanism; relatively fixed friction elements interposed between the friction shoes and the movable friction elements; a pressure transmitting member engaged by the main follower; and spring resistance means opposing inward movement of the pressure transmitting member, the movable friction elements and the friction shoes.

5. In a friction shock absorbing mechanism, the combination with a casing having a friction shell section at the forward end thereof; of fixed friction elements disposed within the casing; movable friction elements interposed between the fixed elements and the casing walls, said movable elements being adapted to receive the actuating force; co-operating means on the movable elements and casing for limiting outward movement of said elements; friction shoes co-operating with the relatively fixed friction elements; a wedge engaging the shoes; a pressure transmitting block also adapted to receive the actuating force, said block being anchored to the casing to limit the same against outward movement; anchoring means on the wedge also co-operating with the casing to limit outward movement of the wedge and maintain the same spaced from the outer ends of the movable friction elements, whereby the wedge will be actuated after a predetermined compression of the mechanism; and spring resistance means opposing inward movement of the pressure transmitting block, friction shoes and movable friction elements.

6. In a friction shock absorbing mechanism, the combination with a casing having a friction shell section at one end thereof; of fixed friction elements disposed within the casing; movable friction elements co-operating with the fixed friction elements; spring resistance means opposing movement of the movable friction elements; friction shoes co-operating with the fixed friction elements; spring means acting independently of said spring resistance means opposing movement of the shoes; a wedge block engaging the shoes; a pressure transmitting means adapted to receive the actuating force; spring resistance means acting independently on said first named spring resistance means and said second named spring means opposing movement of the pressure transmitting means; means for limiting outward movement of the wedge block and pressure transmitting means.

7. In a friction shock absorbing mechanism, the combination with a rectangular casing having detachable liners secured to the side walls at one end thereof, said side walls being provided with abutment ribs spaced rearwardly of the inner ends of the liners; fixed friction elements disposed within the casing and having flanges thereon anchored between the inner ends of the liners and the abutment ribs of the casing; movable friction elements interposed between the fixed elements and the liners, said movable elements having their movement outwardly limited by engagement with abutment means on the liners, said movable elements having pressure receiving flanges at the forward end thereof; a pressure transmitting member adapted to receive the actuating force; means for limiting outward movement of the pressure transmitting member; a wedge member; means for holding the wedge member spaced from the flanges on the movable friction elements in normal full release position of the parts; and spring resistance means opposing movement of the pressure transmitting member, friction shoes and movable friction elements.

8. In a friction shock absorbing mechanism, the combination with a friction shell; of relatively fixed friction elements within the shell; movable friction elements interposed between the friction shell surfaces and the fixed friction elements, said movable friction elements having top and bottom flanges forming wear plate sections co-operating with the opposed top and bottom walls of the friction shell, said wear plate sections embracing the fixed friction elements; friction shoes and a wedge member disposed between said wear plate sections, said wedge having wedging engagement with the shoes and the shoes having frictional engagement with the fixed friction elements; a pressure transmitting member adapted to receive the actuating force; and independent spring means respectively resisting movement of the pressure transmitting member, the friction shoes and the movable friction elements.

In witness that I claim the foregoing I have hereunto subscribed my name this 1st day of November, 1927.

JOHN F. O'CONNOR.